US012182292B1

(12) United States Patent
Zaharia et al.

(10) Patent No.: US 12,182,292 B1
(45) Date of Patent: *Dec. 31, 2024

(54) DATA SHARING FOR NETWORK CONNECTED SYSTEMS

(71) Applicant: Databricks, Inc., San Francisco, CA (US)

(72) Inventors: Matei Zaharia, Palo Alto, CA (US); Shixiong Zhu, Fremont, CA (US); Xiaotong Sun, Mountain View, CA (US); Ramesh Chandra, Sunnyvale, CA (US); Michael Paul Armbrust, Berkeley, CA (US); Ali Ghodsi, Berkeley, CA (US)

(73) Assignee: Databricks, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/162,353

(22) Filed: Jan. 31, 2023

Related U.S. Application Data

(63) Continuation of application No. 17/733,485, filed on Apr. 29, 2022.

(51) Int. Cl.
*G06F 21/62* (2013.01)
*G06F 21/00* (2013.01)
*G06F 21/60* (2013.01)

(52) U.S. Cl.
CPC ........ *G06F 21/6218* (2013.01); *G06F 21/602* (2013.01); *G06F 21/604* (2013.01)

(58) Field of Classification Search
CPC .. G06F 21/6218; G06F 21/602; G06F 21/604; G06F 21/60; G06F 21/62; G06F 21/45; G06F 21/6209; G06F 21/6272
See application file for complete search history.

(56) References Cited

U.S. PATENT DOCUMENTS

| | | | |
|---|---|---|---|
| 10,467,003 B1* | 11/2019 | Mendonca | ................ G06F 8/60 |
| 2013/0117816 A1* | 5/2013 | Dittrich | ................... G06F 21/41 |
| | | | 726/4 |
| 2015/0220516 A1* | 8/2015 | French | ............... G06F 16/9577 |
| | | | 707/722 |
| 2019/0190898 A1* | 6/2019 | Cui | ........................ H04L 67/75 |

OTHER PUBLICATIONS

United States Office Action, U.S. Appl. No. 17/733,485, filed Mar. 12, 2024, 13 pages.

* cited by examiner

*Primary Examiner* — Edward Zee
(74) *Attorney, Agent, or Firm* — Fenwick & West LLP

(57) ABSTRACT

The present application discloses a method, system, and computer system for providing access to data. The method includes receiving, by a data manager service from a data requesting service, a request using an identifier for a high-level data object to access a set of data associated with the high-level data object, determining, by the data manager service, low-level data object(s) corresponding to the set of data based on the identifier for the high-level data object, determining whether a user associated with the request has permission to access at least a subset of the low-level data object(s), and in response to determining that the user associated has permission to access the at least the subset of the low-level data object(s), generating, by the data manager service, a uniform resource locator (URL) via which the at least the subset of the one or more low-level data objects is accessible by the user.

17 Claims, 7 Drawing Sheets

DATA SHARING FOR NETWORK CONNECTED SYSTEMS

CROSS-REFERENCE TO RELATED APPLICATIONS

This application is a continuation application of U.S. patent application Ser. No. 17/733,485, filed on Apr. 29, 2022, which is incorporate by reference herein in its entirety.

BACKGROUND OF THE INVENTION

A system for big data processing comprises a system for deployments of applications, configurations, one or more datasets, and/or model(s) used in connection with analyzing the data. Systems generally handle data access requests by determining information responsive to the corresponding data access request, aggregating such responsive data, and sending the aggregated responsive data to the entity requesting the data access. However, data for big data processing systems can be spread across multiple systems with inconsistent access and security protocols. This can make data access inefficient and cumbersome.

BRIEF DESCRIPTION OF THE DRAWINGS

Various embodiments of the invention are disclosed in the following detailed description and the accompanying drawings.

DETAILED DESCRIPTION

Figure 1:
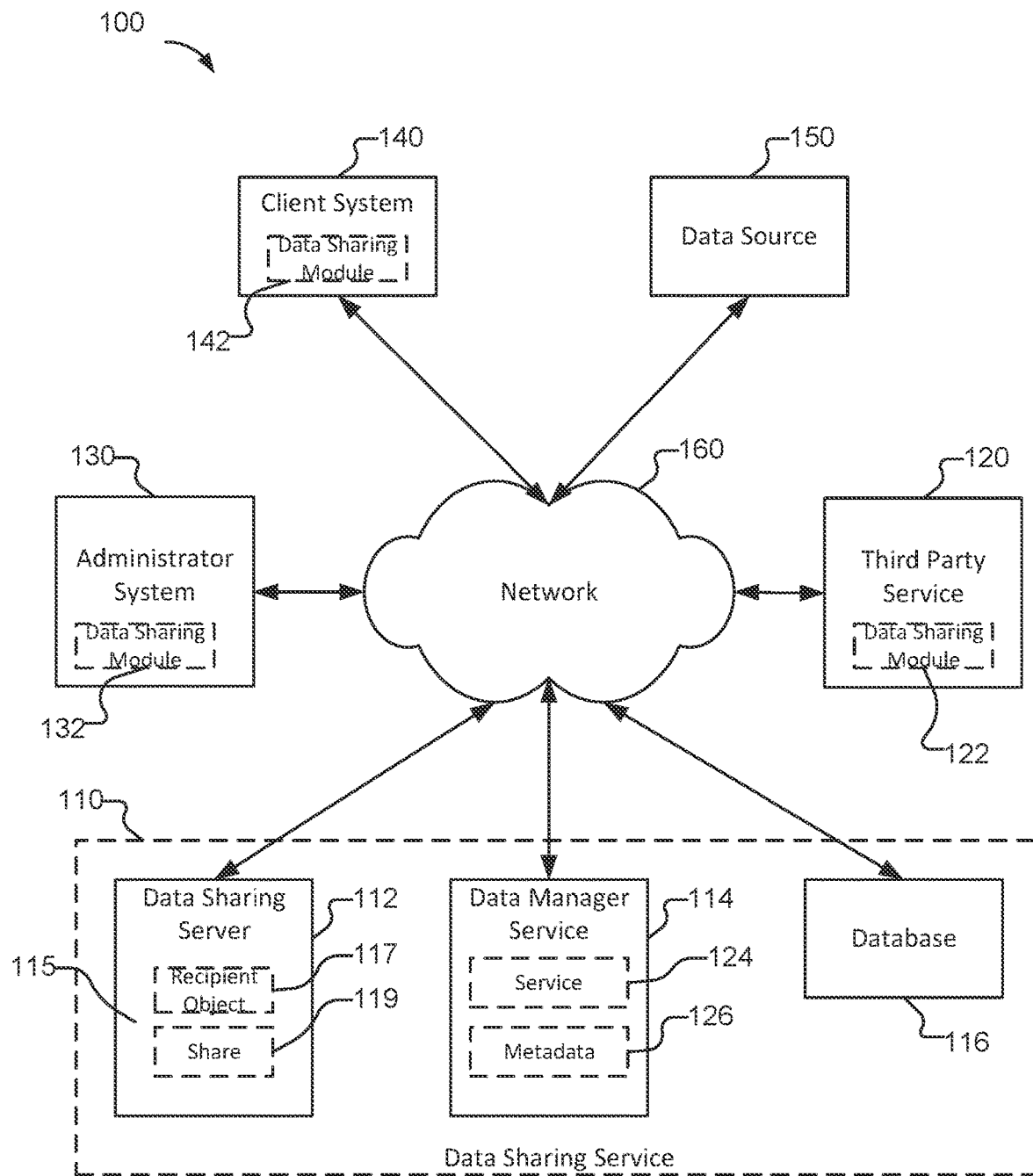
FIG. 1 is a block a diagram of a system for sharing data according to various embodiments of the present application.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

As used herein, a data manager service may be a layer, application, module, or a set of one or more servers that stores, manages, or otherwise has access to, metadata that associates one or more low-level data objects to a high-level data object. The data manager service may mediate data access requests with respect to high-level data object(s) and effectively provides access to data that is responsive to the corresponding access requests for which the requestor is deemed to have the requisite permissions to access. In some embodiments, the data manager service uses the metadata that associates one or more low-level data objects to a high-level data object to obtain at least a partition of the high-level data object. The high-level data object is stored in accordance with a predefined data protocol, such as on a cloud storage (e.g., a storage system hosted by a third party). The predefined data protocol may facilitate delineation of one or more partitions of low-level data objects associated with a particular high-level data object. For example, the predefined data protocol may define (or allow an administrator associated with the data store to define) one or more dimensions of data objects (e.g., a high-level data object) along which the data objects may be partitioned. The data manager service may store, manage, or have access to, the metadata that associates one or more low-level data objects to a high-level data object, and the metadata may include information pertaining to (e.g., a definition of) one or more dimensions of the high-level data object along which the high-level data object is partitioned. As an example, the metadata stores a mapping of partitions of low-level data objects to corresponding high-level data objects. As an example, with respect to tables, the predefined data protocol can define a particular structure of the table that comprises information indicative of how files are mapped (e.g., how low-level data object(s) are mapped to the high-level data object). Accordingly, if a query is run with respect to data comprised in the table, the system knows how the table is formatted and can efficiently determine the applicable low-level data objects responsive to the query. According to various embodiments, the predefined data protocol supports an open data format.

As used herein, a data requesting service may be a layer, application, module, or a set of one or more servers that communicates data access requests to a data sharing service, such as a data sharing service comprising a data manager service. The data requesting service may be a third-party service that is connected to the data manager service via a connector such as an application programming interface (API). Examples of the data requesting service include Tableau (e.g., an analytics software provided by Tableau Software, LLC), Microsoft Power BI, Apache Spark™ (e.g., an open-source unified analytics engine for large-scale data processing), Pandas (e.g., software library written for the Python programming language for data manipulation and analysis available at pandas.pydata.org), or various other sharing clients. In some embodiments, the data requesting service is a module implemented by the data sharing system, and the data requesting service module communicates with such third-party services or other sharing clients.

As used herein, a compute service may be a layer, application, module, or set of one or more servers that obtains a request to provide access to at least part of a high-level data object(s), analyzes the high-level data object(s), and computes a partition of the high-level data object to be shared in response to the corresponding access requests (e.g., the compute service curates the high-level data object to determine the parts of the high-level data object to be provided to a data recipient). In some embodiments, the compute service can execute arbitrary queries on the data and return only the results of the queries—this requires computation to be triggered when the data requesting service issues a request. In some embodiments, the data manager service on the other hand has precomputed results stored in cloud storage objects and returns to the data requesting service the URLs to access the cloud storage objects. In some embodiments, another distinction is that the compute service is in the data path—it reads the data, processes it and sends it to the data requesting service. In some embodiments, the data management service isn't in the data path—it sends the URLs to the data to the data requesting service, which can efficiently fetch the data from the URLs using standard protocols.

The compute service may also provide the partition of the high-level data object that is to be shared. For example, the compute service may provide to a system that receives data access requests the partition of high-level data object(s) to be communicated to an entity requesting access (e.g., the entity, such as a client system that sent the data access request). According to various embodiments, the compute service layer is different from the data requesting service at least in part because the data manager service uses pre-defined delineations/dimensions along which low-level data objects associated with a high-level data object are to be partitioned and provided in response to data access requests, and the compute service affirmatively computes (e.g., determines) a manner by which data such as high-level data object(s) is to be partitioned based at least in part on data access requests. The computation of the partitions of high-level data object(s) to be provided in response to data access requests is relatively resource intensive (e.g., the data manager service determines a partition with respect to a high-level data object more efficiently).

As used herein, a model means a machine learning model. Examples of machine learning processes that can be implemented in connection with training the model include random forest, linear regression, support vector machine, naive Bayes, logistic regression, K-nearest neighbors, decision trees, gradient boosted decision trees, K-means clustering, hierarchical clustering, density-based spatial clustering of applications with noise (DBSCAN) clustering, principal component analysis, etc.

As used herein, a high-level data object may be a data construct that can be partitioned into a set of lower-level data constructs (e.g., low-level data object(s) or sets of low-level data object(s)). Examples of a high-level data object include a model, a table, a view, a schema, a storage location, etc.

As used herein, a low-level data object may be a data construct that is a constituent part of a corresponding high-level data object. The low-level data object can be mapped to (or otherwise associated with) a corresponding high-level data object. Examples of a low-level data object include a file, a sector, a frame, a block, etc. The low-level data object can correspond to a row of a table, a column of a table, a subset of rows and/or columns in a table, a result pertaining to a dimension along a model, etc.

As used herein, a data share (or a share object) is a logical collection of high-level data objects to be shared with one or more data recipients (e.g., data requesting services). For example, the data share is a set of high-level data objects to which a data recipient is provided access subject to access permission requirements for particular subsets of the high-level data object(s).

According to various embodiments, a system, method, and/or device for providing access to data is disclosed. The system comprises one or more processors and a memory. The one or more processors are configured to (i) receive, by a data manager service from a data requesting service, a request using an identifier for a high-level data object to access a set of data associated with the high-level data object, (ii) determine, by the data manager service, one or more low-level data objects corresponding to the set of data based on the identifier for the high-level data object, (iii) determine, by the data manager service, whether a user associated with the request has permission to access at least a subset of the one or more low-level data objects, (iv) in response to a determination that the user associated with the request has permission to access at least the subset of the one or more low-level data objects, (a) generate, by the data manager service, a uniform resource locator (URL) via which at least the subset of the one or more low-level data objects is accessible by the user, wherein the URL is generated based at least in part on a credential to access at least the subset of the one or more low-level data objects, and (b) provide, from the data manager service, the URL to the data requesting service.

Related art systems generally comprise a compute service that analyzes a high-level data object and determines a subset of low-level data objects associated with the high-level data object that are be provided in response to a particular data access request. The compute service according to related arts expends significant resources to determine a partition of a high-level data object (e.g., a subset of low-level data objects) that is responsive to a data access request. In response to determining the partition of the high-level data object to provide in response to a data request, the compute service generates the partition and provides the partition to a data requesting service such as a client system that communicated the data access request. The computation, generation, and communication of a partition to provide in response to a data access request generally requires significant processing, storage, and bandwidth resources.

An example of a process for sharing data according to related art systems includes (i) receiving a data access request, (ii) determining whether the requested data resides in a client dataset, (iii) in response to determining that the requested data resides in the client data set, determining how the data is stored (e.g., determine a protocol according to which the data is stored), (iv) determining an access permission for the entity requesting the data, (v) writing a specific access for the requested data based on the access permission (e.g., the specific access to include only data for which the entity has requisite access permissions), and (vi) transferring of the specific access to the entity. Because related art systems read the data being requested (e.g., to determine how the data is stored and/or to write specific access corresponding to a subset of the data), the related art systems are generally only able to process the data (and data access requests) in series, which may cause a bottleneck or inefficiency with respect to data sharing.

According to various embodiments, the system determines a partition of a high-level data object(s) to provide in response to a data access request based at least in part on a metadata stored in association with the high-level data object. For example, a data access request may include an identifier of a high-level data object (e.g., a table name) for which a data requesting service desires access, and the system uses the identifier of the high-level data object in connection with querying/performing a lookup with respect to metadata associated with the high-level data object to determine one or more low-level data objects associated with the high-level data object (e.g., low-level data objects mapped to the high-level data object). In some embodiments, the metadata includes information indicative of one or more pre-determined partitions of the high-level data object, one or more dimensions of the high-level data object along which the high-level data object is partitioned (or to be partitioned), or a manner by which access is to be provided to low-level data objects associated with the high-level data object. According to various embodiments, a system (e.g., a storage system) that stores the high-level data object implements a predefined data protocol according to which the metadata is stored with respect to high-level data objects stored at the storage system, and the metadata comprises information indicative of one or more pre-determined partitions of the high-level data object, one or more dimensions of the high-level data object along which the high-level data object is partitioned (or to be partitioned), and/or a manner by which access to low-level data objects associated with the high-level data object is to be provided.

In some embodiments, the system stores a plurality of files corresponding to a partition of the high-level data object. In response to receiving a high-level data object and associated metadata, the storage system stores the high-level data object as a set of files (e.g., low-level data objects) based at least in part on the metadata. For example, the system (i) determines, based at least in part on the metadata, one or more pre-determined partitions of the high-level data object, one or more dimensions of the high-level data object along which the high-level data object is to be partitioned, and/or a manner by which access to low-level data objects associated with the high-level data object is to provided, and (ii) stores a set of low-level data objects (e.g., files) respectively corresponding to partitions or access rights for the high-level data object. In some embodiments, the system (e.g., the storage system) segments the high-level data objects into the corresponding set of low-level data objects, and stores metadata indicating a relationship between the set of low-level data objects and the high-level data object. The system can further store information mapping the set of low-level data objects to the corresponding high-level data object. For example, the system stores information indicating a relationship between a particular low-level data object and a corresponding high-level data object. As an example, in the case of the high-level data object being a table, the system stores metadata indicating a row, a column, or a part of a row and/or column of the table to which a low-level data object (e.g., a file) corresponds.

According to various embodiments, the system segments a high-level data object into a set of low-level data objects and stores the set of low-level data objects and metadata indicating the mapping/relationship of a particular low-level data object to the high-level data object. In some embodiments, the system performs the segmentation of the high-level data object in connection with a request to store the high-level data object (e.g., contemporaneous with the storage system receiving the high-level data object for storage, etc.). The system segments the high-level data object based on the predefined data protocol according to which the data on the storage system is stored (e.g., the protocol according to which the high-level data object is to be stored).

In some embodiments, the metadata stored in connection with a set of low-level data objects and/or a high-level data object comprises a mapping of permissions of the high-level data object to the low-level data object. For example, the predefined data protocol according to which the high-level data object can segment the high-level data object along an access permissions dimension (e.g., segments the high-level data object into a plurality of sets of one or more low-level data objects that respectively correspond to a particular access permission). The access permissions can be defined in a security policy (e.g., a security policy that is configurable by an administrator of the system, etc.). The system can store metadata indicating requisite access permissions to corresponding low-level data objects. The system can use the metadata indicating the requisite access permissions to corresponding low-level data objects to determine whether a user or system (e.g., a data requesting service) associated with a data access request has appropriate permissions to access a particular low-level data object. The system can use the metadata indicating the requisite access permissions to corresponding low-level data objects to determine one or more low-level objects, if any, to which a user or system (e.g., a data requesting service) associated with a data access request has appropriate permissions to access (e.g., in connection with a request to access the high-level data object to which the low-level data object(s) is/are mapped).

According to various embodiments, the storage system storing the high-level data object and the data requesting service implement the predefined data protocol (e.g., a protocol that defines/indicates metadata to be stored in association with the high-level data object and/or a segmentation to be performed with respect to the high-level data object). As an example, a data requesting service implements a connector or other module (e.g., an application programming interface (API)) via which the data requesting service is connected to the data manager service and/or the storage system on which the high-level objects (or the corresponding set of low-level data objects) is stored. The data requesting service (e.g., a client system, a third-party cloud service, etc.) can use the connector/module to (i) discover shared data (e.g., high-level data objects that can be consumed), (ii) view the metadata about the shared data and (iii) consume the shared data directly (e.g., partitions of the shared data to which the data requesting service has access permissions). In some embodiments, in connection with requesting access to a high-level data object, the data requesting service provides authentication information to the data manager service, and the data manager service uses the authentication to authenticate the data requesting service and/or determine access permissions/authorizations for the data requesting service. Providing authentication information can include providing a credential(s) to data manager service (e.g., a token, a username and password, etc.). The data manager service uses the credential to authenticate the data requesting service and/or determine the access permissions for the data requesting service. Other examples of the authentication information can include an IP address (e.g., for IP address-based access control), a geographic location of the data requesting service (e.g., for geographic region-based access control), a data requesting service identifier, etc.

According to various embodiments, a system (e.g., a data sharing service) provides access to a set of data (e.g., a partition of a high-level data object) without requiring access via a compute service. For example, the system uses the data manager service to determine the set of data to which access is provided based at least in part on metadata stored in association with the high-level object (e.g., metadata stored in connection with the storage of information according to a predefined data protocol). In some embodiments, the access to the set of data provided by the system without requiring access via the compute service (e.g., by using the data manger service) is a read-only access.

According to various embodiments, a system (e.g., a data sharing service) provides access to a set of data via a Uniform Resource Locator (URL). For example, in response to a data access request, the system determines the set of data to which access is provided and obtains a URL corresponding to the set of data to which access is to be provided as responsive to the data access request (e.g., a subset of information pertaining to a high-level data object to which a user has requisite permission). The URL can be determined based at least in part on the metadata that associates one or more low-level data objects (e.g., files, partitions, sectors, blocks, etc.) with a high-level data object. For example, the URL is determined (e.g., by the data sharing service) based at least in part on a mapping of low-level data objects to the high-level data object(s) responsive to the data access request. In some embodiments, obtaining the URL comprises generating the URL via which a data requesting service can access the set of data. As an example, the URL corresponds to a location of a partition of a high-level object on a storage system (e.g., a cloud storage system such as a third-party storage system, etc.) that is responsive to the data access request and to which the user has permission to access. In some embodiments, the URL expires after a predefined period of time (e.g., an amount of time after generation of the URL or an amount of time after sending the URL to the data requesting service or other system associated with the corresponding data access request). In some embodiments, the predefined period of time is set based on administrator configurations or a security policy for the system. Examples of a predefined period of time include 30 minutes, 1 hour, 2 hours, 3 hours, 1 day, etc. The URL is configured based on a predefined data protocol according to which data stored on the storage system is stored. For example, the URL is configured to point to a selected file, partition, sector, block, etc. of a high-level data object(s) to which access is to be provided in response to the data access request. In some embodiments, the URL is generated based at least in part on a credential to access the data at the storage system. For example, the URL comprises a credential for accessing the data at the storage system.

According to various embodiments, a URL is generated based on a determination to provide access to a first subset of files and to withhold access to a second subset of files. In some embodiments, the URL includes a cryptographic key or a reference to a cryptographic key such as a location at which the cryptographic key can be accessed. The cryptographic key can be used to provide access to a first subset of files and to withhold access to a second subset of files. For example, the cryptographic key can correspond to a credential that enables decryption of a set of low-level data objects such as files, or information corresponding to a subset of a table (e.g., a particular set of rows, a particular set of columns, a portion of one or more rows or columns, etc.). For example, the system uses an encryption of a partition of low-level data object(s) corresponding to a high-level data object to enforce access rights or to implement the delineation among partitions for the high-level data object. A first file or a first row of a table can be encrypted using a first cryptographic key, and a second file or second row of the table can be encrypted using a second cryptographic key that is different from the first cryptographic key. In various embodiments, any other portions of a table are encrypted using different keys—for example, a column, an area, a volume, a range of rows, a range of columns, a section, etc. In response to receiving a data access request and a determination that access to the first file/row/column/section is to be provided and that access to the second file/row/column/section is to be restricted, the URL is configured to comprise (or reference/point to) the first cryptographic key (e.g., and to exclude the second cryptographic key). In various embodiments, other high-level objects (e.g., models, a view, a schema, etc.) or portions thereof are similarly managed for access control.

According to various embodiments, the system (e.g., the data manager service) provides access to a set of data (e.g., a set of low-level data objects associated with a high-level data object) by communicating one or more URLs to the data requesting service. In some embodiments, the one or more URLs are pre-signed such as with a credential with which the data requesting service can obtain (e.g., retrieve) the corresponding set of low-level data objects from a storage system (e.g., a cloud storage system, such as a storage system provided by a third party service such as Microsoft Azure, Amazon Web Services, Google Cloud Platform, etc.). In contrast to related art systems, one or more URLs are communicated to the data requesting service rather than separately retrieving and sending the underlying data. Providing the set of data via access based on one or more URLs is more efficient and scalable than related art systems, which transmit the set of data to the data requesting service. For example, relatively large amounts of data (e.g., terabytes-level data) can be shared by the system, which may not have been feasible by transmitting the underlying data according to related art systems. In addition, the sharing of data via providing one or more URLs rather than communication of the underlying data to be shared saves bandwidth and increases system throughput. Further, various embodiments can implement a file skipping based on file metadata and statistics.

According to various embodiments, in response to receiving a data access request and providing access to a corresponding set of data, the system (e.g., the data sharing service) stores information pertaining to the data access request and/or providing of access. The information pertaining to the data access request and/or providing of access can be stored in an audit log. The system can query the audit log in connection with auditing data sharing activities (e.g., by a data provider) and/or data access activities (e.g., by a data recipient such as a data requesting service, etc.).

According to various embodiments, an administrator of data sharing system (e.g., an administrator of a dataset) can provide a data requesting service with access to a dataset by adding the data recipient (e.g., the entity associated with the data requesting service) to a policy or account or access control metadata structure. In response to the recipient being added to a user account associated with the dataset (e.g., an account for the organization storing the dataset), the data sharing service obtains and provides the data sharing system with a one-time activation link to send to the data recipient in order to securely transfer credentials to the data recipient. The recipient can use this one-time activation to download a setup file containing a URL and authentication token for the data to be shared by the data sharing system (e.g., the dataset), or the data recipient can input information pertaining to the one-time activation link into a user interface of the data sharing service to add the data to be shared directly into the data recipient's workspace on the data sharing service. For example, the recipient uses the one-time activation link to mount the dataset to his/her own environment (e.g., his/her workspace on the data sharing service, or an environment on a platform provided by the data requesting service, etc.).

Various embodiments improve on the extensibility and efficiency for sharing data. Related art systems generally perform intensive computation to determine a set of data to which access is able to be provided, communicate the set of data (which can be relatively large), and generally implement a data sharing in a closed data format that is proprietary to the storage system platform. Various embodiments implement a predefined data protocol that is an open protocol and enables data requesting services to be on different platforms from the data sharing service (e.g., the data manager service). Accordingly, data recipients can use various tools to access data being shared by the data sharing service (e.g., the various tools can connect to the data sharing service via a connector such as an API). In some embodiments, data recipients (e.g., the data requesting service) does not require an account with the data sharing service (e.g., the data manager service). For example, an administrator of a dataset can configure the data sharing service to provide access to certain data requesting services or identifiers/credentials associated with a data requesting service (e.g., such identifiers/credentials to be communicated to the data manager service in connection with a data access request for authentication of the data requesting service). Further, various embodiments enable sharing of an entire high-level data object (e.g., an entire table), or a single version of the high-level data object (e.g., the table), or a certain partition of the high-level data object (e.g., a certain partition of the table), etc.

FIG. 1 is a block a diagram of a system for sharing data according to various embodiments of the present application. According to various embodiments, system 100 implements at least part of process 300 of FIG. 3, process 400 of FIG. 4, process 500 of FIG. 5, process 600 of FIG. 6, and/or process 700 of FIG. 7.

In the example illustrated in FIG. 1, system 100 includes data sharing service 110, third-party service 120, administrator system 130, client system 140, and/or data source 150. In some embodiments, data sharing service 110, and/or data source 150 are integrated (e.g., combined into a layer or a single set of servers). System 100 further includes one or more networks such as network 160 over which administrator system 130 and/or client system 140 communicates with data sharing service 110, third-party service 120, and/or data source 150. In various embodiments, network 160 includes one or more of a wired networks, and/or a wireless network such as a cellular network, a wireless local area network (WLAN), or any other appropriate network. System 100 may include various other systems or devices.

In some embodiments, data sharing service 110 comprises data sharing server 112, data manager service 114, and database 116. Data sharing server 112, data manager service 114, and/or database 116 can be respectively implemented by one or more servers. In some embodiments, data sharing server 112, data manager service 114, and/or database 116 are implemented by a single server or a same set of one or more servers.

According to various embodiments, data sharing service 110 mediates data access requests communicated by data recipients such as third-party service 120 and/or client system 140. Data sharing service 110 exposes data (e.g., a data share) to share with one or more data recipients. In some embodiments, data sharing service 110 exposes the data to share (e.g., the data share) using a predefined data protocol. For example, the data recipients may comprise/execute a connector or other module (e.g., an API) to interface/communicate(s) with data sharing service 110. The connector or other module can implement the predefined data protocol, which can allow data recipients to consume the data exposed by data sharing service 110. Examples of the connector or other module include data sharing module 122 of third-party service 120 and/or data sharing module 142 of client system 140.

Data sharing service 110 efficiently mediates data access requests received from a data recipient based at least in part on querying metadata associated with a data share. In some embodiments, the metadata (e.g., metadata 126 shown being stored using data manager service 114) includes information indicative of one or more pre-determined partitions of a high-level data object comprised in the data share, one or more dimensions of the high-level data object along which the high-level data object is partitioned (or to be partitioned), and/or a manner by which access is to be provided to low-level data objects associated with the high-level data object. In some embodiments, metadata 126 is stored on data manager service 114. In some embodiments, metadata 126 is stored on database 116 and/or data sharing server 112, and metadata 126 is accessible by data manager service 114.

A data recipient communicates a data access request to data sharing service 110 (e.g., to data manager service 114). In some embodiments, the data access request is configured based on the predefined data protocol. For example, the data recipient (e.g., a data requesting service) uses a connector (e.g., data sharing module 122 of third-party service 120 or data sharing module 142 of client system 140, etc.) to communicate the data access request to data sharing service 110. In some embodiments, the data access request comprises an identifier of a high-level data object (e.g., a table name) for which the data recipient is requesting access. The data access request can be communicated in connection with a credential for the data recipient with respect to data sharing service 110 (e.g., a credential or identifier that identifiers the data recipient, etc.). As an example, the data access request comprises the credential for the data recipient or and identifier. As another example, the credential is provided by the data recipient to data sharing service 110 in association with a connection being established between data sharing service 110 and the data recipient.

In response to data manager service 114 receiving the data access request (e.g., service 124 running on data manager service 114 receiving the data), data manager service 114 uses the identifier associated with the high-level data object to determine one or more low-level data objects associated with (e.g., mapped to) the high-level data object. For example, the identifier associated with the high-level data object is used (e.g., by service 124) to query the metadata (e.g., metadata 126) corresponding to the high-level data object to determine the one or more low-level data objects associated with the high-level data object. In some embodiments, data manager service 114 receives the data access request, and in response to receiving the data access request, data manager service 114 determines whether the data recipient (e.g., the entity from which the data access request was communicated) has permission to access the high-level data object corresponding to (e.g., identified by) the data access request. In some embodiments, as part of determining permissions for access to the high-level object, data manager service 114 determines whether the data recipient has permission to access one or more portions of low-level data objects corresponding to the high-level data object.

Data manager service 114 uses a credential included (or referenced in) the data access request to authenticate the data recipient. For example, data manager service 114 determines whether the data recipient has authorization/permissions to access the high-level data object. As another example, data manager service 114 queries an authentication module to authenticate the data recipient and to provide an indication of whether the data recipient is authorized (e.g., has requisite access permissions) to access the high-level data object. In some embodiments, in response to determining that the data entity has permission to access the high-level data object, data manager service 114 uses metadata 126 in connection with determining one or more low-level data objects associated with the high-level data object.

In response to determining the one or more low-level data objects associated with the high-level data object, data manager service 114 determines a set of low-level data objects (e.g., a subset of the one or more low-level data objects associated with the high-level data object) to which the data recipient has the requisite permissions. For example, data manager service 114 determines the partition(s) of the high-level data object (e.g., set(s) of low-level data objects) to which the data recipient has access using the metadata (e.g., stored in metadata 126) associated with the high-level data object.

Data manager service 114 provides to a data recipient access to one or more low-level data objects (e.g., mapped to a high-level data object subject to a data access request, such as a high-level data object comprised in a share with the data recipient). In some embodiments, data manager service 114 (e.g., service 124) provides to the data recipient access to the one or more low-level data objects via one or more URLs corresponding to a location at which the one or more low-level data objects can be obtained (e.g., a location on a cloud storage system from which the low-level data object can be accessed). As an example, data manager service 114 obtains (e.g., generates) the URL(s) based at least in part on the metadata for the high-level data object subject to (e.g., identified by) a data access request. For example, the URL(s) is determined (e.g., by the data manager service 114) based at least in part on a mapping of low-level data objects to the high-level data object(s) responsive to the data access request. The URL(s) for accessing the low-level data objects in response to the data access request can be generated by service 124 of data manager service 114. For example, the request for data using a high-level data object identifies corresponding low-level objects using metadata, checks permissions, does not allow access to low-level objects for which access is not permitted and hence does not generate URLs for those low-level objects, allows access to low-level objects for which access is permitted and therefore does generate URLs for these low-level objects, and provides indications to the requestor of the data. In some embodiments, the indication comprises an indication that permission is denied for accessing the high-level object. In various embodiments, the indication comprises an indication that permission is allowed for accessing the high-level object and/or the URLs that enable the requestor to access the requested data directly.

In some embodiments, obtaining the URL comprises generating the URL via which a data requesting service can access the set of data. As an example, the URL corresponds to a location of one or more partitions of a high-level object on a storage system (e.g., a cloud storage system such as a third-party storage system, etc.) that is responsive to the data access request and to which the user has permission to access. The URL can be configured based on a location of the corresponding low-level data object(s), a credential for accessing the low-level data objects (e.g., that are stored on a storage system such as a cloud storage system—for example, data source 150 or database 116), and a location of the low-level data objects. In some embodiments, database 116 comprises a cloud-based storage system that is distinct from the system that requests the data. In some embodiments, the URL expires after a predefined period of time (e.g., an amount of time after generation of the URL, or after sending the URL to the data requesting service or other system associated with the corresponding data access request). For example, data manager service 114 configures the URL with an expiration time corresponding to a predefined period of time after which the URL expires (and is no longer usable to access the corresponding low-level data object(s)). As another example, the URL comprises a timestamp from the time at which the URL is generated, and the cloud storage system implements a predefined period of time after which the corresponding URL is deemed expired. For example, the cloud storage system can use a time at which the URL is accessed by the data recipient, the timestamp associated with the URL generation, and the predefined period of time after which the URL is deemed expired in connection with determining whether the URL is expired or active. The predefined period of time may be set based on administrator configurations or a security policy for the system. Examples of a predefined period of time include 30 minutes, 1 hour, 2 hours, 3 hours, 1 day, etc. In some embodiments, the cloud storage system receives a URL for accessing data; checks a time embedded in the URL; in response to the time indicating a valid time (e.g., within an access window), providing the data to a requestor; in response to the time indicating an invalid time (e.g., outside an access window—for example, after a the URL has expired), indicating to the requestor that the request for the data is denied. In various embodiments, the URL includes a request time, an expiration time, a valid time window (e.g., a start time and a stop time) or any other appropriate time associated with the request for data.

In some embodiments, the URL is configured based on a predefined data protocol according to which data stored on the storage system is stored. For example, the URL is configured to point to a selected partition of a high-level data object(s) to which access is to be provided in response to the data access request. In some embodiments, the URL is generated based at least in part on a credential to access the data at the storage system. For example, the URL comprises a credential for accessing the data at the storage system. As another example, the URL is signed with a credential for accessing the data at the storage system.

According to various embodiments, the URL(s) is/are used to enforce access permissions with respect to the high-level data object on a partition-by-partition basis. For example, sets of low-level data objects respectively corresponding to partitions of the high-level data object can be stored at different locations on the storage system, and the URL(s) is/are configured based on a location to the one or more sets of low-level data objects to which access is to be provided (e.g., in response to the data access request). For one or more sets of low-level data objects for which access is to be restricted (e.g., not provided in response to the data access request), the URL is configured to exclude locations of such set(s) of low-level data objects. As another example, the URL is configured based on one or more cryptographic keys (e.g., a cryptographic key that is comprised in a pair comprising a cryptographic key that was used to encrypt certain data). For example, data manager service 114 configures the URL to include (or reference) one or more cryptographic keys for one or more sets of low-level data objects for which access is to be provided to the data recipient. In response to data manager service 114 determining that the data recipient does not have permission to access a particular set of low-level data object(s), data manager service 114 configures the URL to exclude cryptographic keys for such particular set of low-level data object(s). Because the URL is configured to exclude cryptographic keys for low-level data objects to which the data recipient does not have permission to access, the data recipient will not be able to consume (e.g., decrypt and read) the corresponding low-level data objects. In some embodiments, the URL includes valid cryptographic keys for accessing permitted low-level objects and invalid keys to deny access to non-permitted low-level objects (e.g., a null or dummy key).

In some implementations, the high-level data object is a table. The table can be mapped to at least a first subset of files and a second set of files (e.g., respectively corresponding to partitions of the table). In some embodiments, the first subset of files is encrypted based at least in part on a first cryptographic key associated with the first subset of files, and the second subset of files is not encrypted based at least in part on the first cryptographic key. In response to determining that access is to be provided to the second subset of files, the system obtains the URL based at least in part on such a determination and the URL is generated to exclude a credential for decrypting the first subset of files. In this example, the credential for decrypting the first subset of files is not provided so access to the first subset of files is denied and the credential for decrypting the second subset of files is provided so access to the second subset of files is allowed. In contrast, in response to a determination to provide access to the first subset of files, the system obtains the URL based on such a determination and the URL is generated to include the credential for decrypting the first subset of files (e.g., the first cryptographic key).

Data sharing service 110 comprises database 116, which comprises one or more high-level data objects. Database 116 can be stored at a cloud storage system, such as a storage system provided by a third-party service provider. In some embodiments, data source 150 provides a high-level data object(s) to database 116 for storage. Database 116 can be configured based at least in part on the predefined data protocol. The high-level data object is stored in accordance with a predefined data protocol, such as on a cloud storage (e.g., a storage system hosted by a third party). The predefined data protocol may facilitate delineation of one or more partitions of low-level data objects associated with a particular high-level data object. For example, the predefined data protocol defines (or allow an administrator associated with the data store to define) one or more dimensions of data objects (e.g., a high-level data object) along which the data objects may be partitioned. Data source 150 can communicate with data sharing service 110 (e.g., data manager service 114 or database 116) in accordance with the predefined data sharing protocol in connection with storing high-level data objects in database 116.

According to various embodiments, a data share can be configured via data sharing service 110. For example, an administrator can use administrator system 130 to configure a data share. Administrator system 130 communicates with data sharing service 110 via data sharing module 132 comprised in administrator system 130. Data sharing module 132 is a connector such as an API via which administrator system 130 connects to data sharing service 110. The administrator system 130 can be used to define one or more configurations or settings of data sharing service 110. In some embodiments, administrator system 130 configures a data share (e.g., share 119) to be exposed to one or more data recipients. For example, an administrator selects a database, or a set of high-level data objects to be exposed to data recipients (e.g., a set of predefined data request services or clients, etc.). Share 119 stores information indicating the data comprised in data share. In connection with exposing the data share to the one or more data recipients, a recipient object 117 is configured to store information pertaining to the recipients. For example, an administrator (e.g., an administrator of data sharing service 110) can define a set of data recipients (e.g., identifiers or addresses corresponding to the data recipient(s), etc.) to which the data share is to be exposed. As another example, data recipients register accounts with data sharing service 110. Recipient object 117 can store an address or identifier associated with a data recipient, and a credential associated with the data recipient. For example, recipient object 177 stores a mapping of credentials to data recipients. The credentials are obtained (e.g., generated) by data sharing service 110 and provided to the data recipients (e.g., either directly from data sharing service 110, or via administrator system 130). A data recipient uses a credential in connection with consuming data exposed in the data share. For example, the data recipient (e.g., third party service 120, client system 140, etc.) communicates the credential via data access requests for accessing a high-level object in the data share. Data sharing service 110 (e.g., data manager service 114) can determine whether a data recipient has authorization to access the high-level object based at least in part on the credential.

According to various embodiments, system 100 comprises an administrator system 130 for use by an administrator such as an administrator of data sharing service 110 or an administrator of a user associated with a database 116 and/or an instance of data manager service 114 and/or data sharing server 112. For example, administrator system 130 comprises a system for communication, data access, computation, etc. An administrator uses administrator system 130 to maintain database 116 (e.g., maintain raw data comprised in database 116), to define and manage applications provided by system 100, etc. For example, an administrator uses administrator system 130 to define one or more security policies that are to be enforced (e.g., by data sharing service 110 and/or data sharing server 112) with respect to a data stored in database 116 (e.g., data exposed to data recipients via a data share). As another example, an administrator uses administrator system 130 to define a data protocol according to which data is stored in database 116 and/or consumed by data recipients via data access requests configured in accordance with such data protocol. In embodiments, administrator system 130 communicates with data sharing service 110 via a web-interface (e.g., by using a web browser, etc.), For example, administrator system 130 communicates with data sharing service 110 via a web-browser installed on administrator system 130 (e.g., via a user interface configured by an application running on data sharing service 110). In some embodiments, administrator system 130 communicates with data sharing service 110 via an application or service running on administrator system 130 (e.g., data sharing module 132 such as a connector or API corresponding to data sharing service 110).

In some embodiments, an administrator of a dataset (e.g., database 116) can use administrator system 130 to configure the data sharing service 110 to create a share object to represent the data to be shared to one or more third party services (e.g., data requesting services) such as third-party service 120. The administrator can then add to the share object high-level data objects (e.g., tables, views, etc.) stored in a dataset. The administrator then requests data sharing service 110 to create a data recipient (e.g., corresponding to an entity or system with which the administrator wants to share the share object) and to provide an activation link (e.g., a one-time activation link) to be provided to the data recipient (e.g., for the data recipient to mount the share object with their own workspace on data sharing service 110 or third-party service 120, etc.). In response to receiving the activation link, the administrator uses administrator system 130 to communicate the activation link to the data recipient. For example, the administrator can request that data sharing service 110 provide the activation link to the data recipient (e.g., third-party service 120), or can request that data sharing service 110 provide the activation link to administrator system 130, which can in turn provide the activation link to the data recipient. The administrator configures data sharing service 110 to provide the data recipient (e.g., the data requesting service associated with the activation link) with access to the share object. In some embodiments, data sharing service 110 stores an audit log that comprises information pertaining to data sharing activities (e.g., by data share entities such as the account for data sharing service 110 associated with the share object to be shared) and/or data access activities (e.g., by data recipients). Upon mounting the share object, the data recipient (e.g., third-party service 120) can consume data comprised in the data object as an external dataset (e.g., high-level object such as a table, etc.).

According to various embodiments, system 100 comprises client system 140. Client system 140 is used by a user such as a user corresponding to a data recipient (e.g., a developer such as a developer of code, a developer of a model, a user of an organization associated with a one or more datasets stored at database 116, etc.) to communicate with data sharing service 110 (e.g., data sharing server 112, data manager service 114, etc.) and/or data stored in database 116. As an example, client system 140 communicates with data sharing service 110 via a web-interface. In some embodiments, client system 140 communicates with data sharing service 110 via an application or service running on client system 140 (e.g., data sharing module 142 such as a connector or API corresponding to data sharing service 110). In some embodiments, a user uses client system 140 to develop code on a business application layer, which makes a call to with respect to data exposed via a data share, or to invoke a task to be performed with respect to certain data stored in database 116, to modify code at a business application (e.g., to execute code against data stored in database 116), to query database 116 or a data share corresponding to a subset of high-level data objects in database 116 (e.g., in connection with discovering code, a library, a module, etc.), etc.

According to various embodiments, system 100 comprises one or more third-party services such as third-party service 120. Third-party service 120 is a data recipient (e.g., a data requesting service) that consumes data exposed via data shares provided by data sharing service 110. Third-party service 120 can connect to (e.g., communicate with) data sharing service 110 via data sharing module 122. Examples of the third-party service 120 include Tableau (e.g., an analytics software provided by Tableau Software, LLC), Microsoft Power BI, Apache Spark™ (e.g., an open-source unified analytics engine for large-scale data processing), Pandas (e.g., software library written for the Python programming language for data manipulation and analysis available at pandas.pydata.org), or various other sharing clients. In some embodiments, in response to third-party service 120 being defined as a data recipient with respect to data sharing service 110 (e.g., in response to an administrator of database 116 configuring data sharing server 112 to define third party service 120 as a data recipient), third party service obtains a credential issued (e.g., generated an/or provided) by data sharing service 110. Third-party service 120 can use the credential and/or information pertaining to the data share associated with the credential in connection with mount the data share to its own environment (e.g., its workspace on data sharing service 110, or an environment on a platform provided by third-party service 120, etc.).

Figure 2:
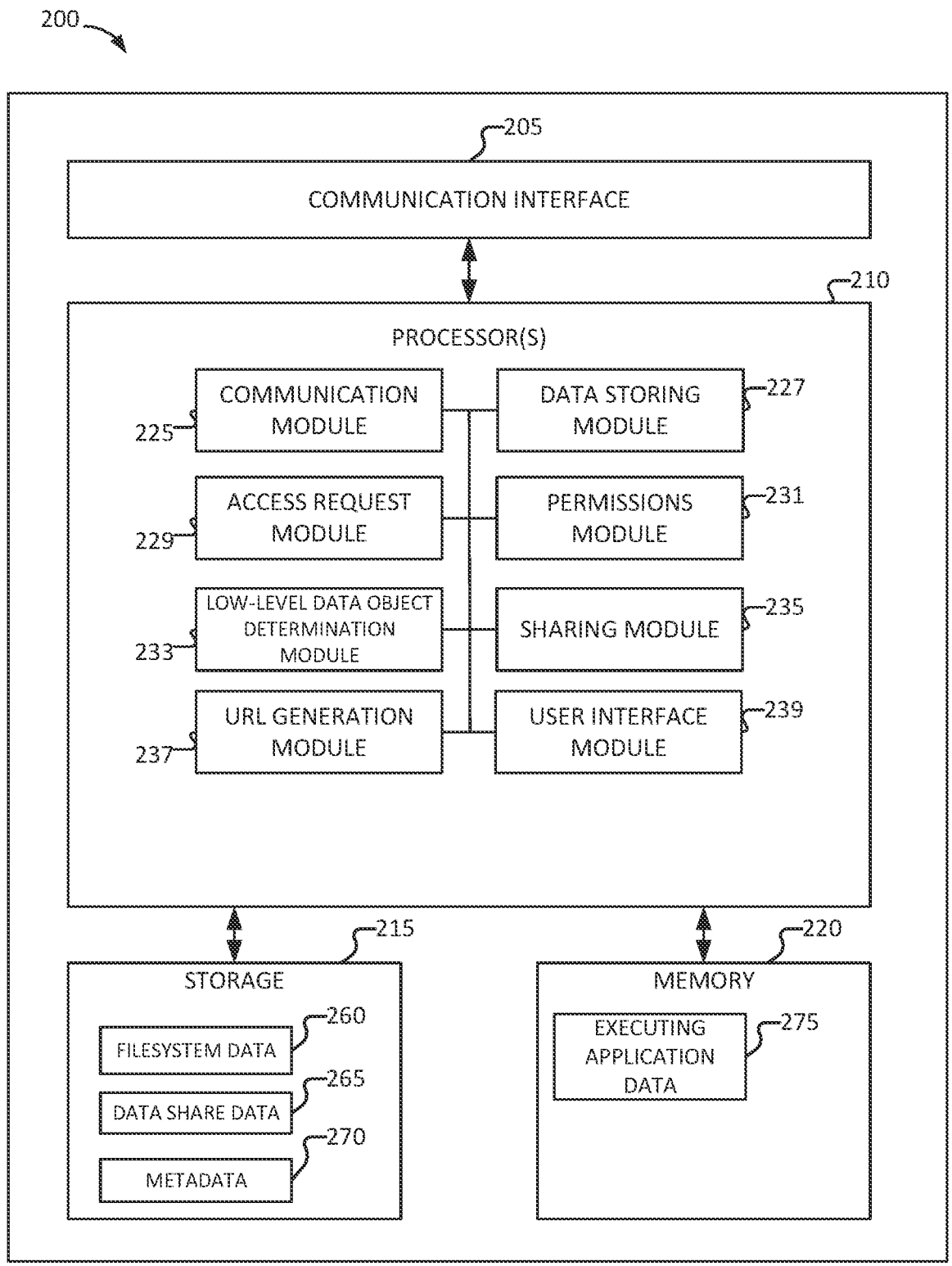
FIG. 2 is a block diagram of a system for sharing data according to various embodiments of the present application.

FIG. 2 is a block diagram of a system for sharing data according to various embodiments of the present application. According to various embodiments, system 200 is implemented at least in part by system 100 of FIG. 1. According to various embodiments, system 200 implements at least part of process 300 of FIG. 3, process 400 of FIG. 4, process 500 of FIG. 5, process 600 of FIG. 6, and/or process 700 of FIG. 7. In some embodiments, system 200 is used to implement data sharing service 110 of FIG. 1.

In the example shown, system 200 implements one or more modules in connection with managing data shares and/or mediating access by data recipients with respect to a data share(s). System 200 comprises communication interface 205, one or more processors 210, storage 215, and/or memory 220. One or more processors 210 comprises, or implements, one or more of communication module 225, data storing module 227, access request module 229, permissions module 231, low-level data object determination module 233, sharing module 235, URL generation module 237, and user interface module 239.

In some embodiments, system 200 comprises communication module 225. System 200 uses communication module 225 to communicate with various other systems such as a user system, an administrator system, and/or a data store (e.g., a distributed data storage system). For example, communication module 225 provides to communication interface 205 information that is to be communicated. As another example, communication interface 205 provides to communication module 225 information received by system 200. Communication module 225 is configured to receive user input to a user system such as a data access request a request to configure a data sharing service, a security policy, a sharing policy, an access policy, a predetermined time period for expiration of URLs, a storage system configuration such as a configuration for a partitioning of high-level data objects. The user input to the user system can include the creation of a new file, a modification or update to a file, a query for a file (e.g., a csv file, a library, a module, etc.), a request to set one or more security policies (e.g., a permission with respect to accessing a file or a directory), a request to set one or more sharing policies, a request to configure a data protocol according to which data is stored on the storage system, a request to configure a data recipient and/or a list of data recipients, a request to configure permissions for one or more data recipients, etc. Communication module 225 is configured to provide various user systems or data requesting services with information such as user interface (e.g., an interface corresponding to a workspace or notebook), information that is responsive to one or more queries or tasks requested to be executed, locations at which data is to be accessed, credentials for accessing data, URLs corresponding to locations at which data responsive to data access requests can be retrieved, etc. In some embodiments, communication module 225 communicates with data recipients (e.g., data requesting services such as third-party services, or client systems) based at least in part on a predefined protocol.

In some embodiments, system 200 comprises data storing module 227. System 200 uses data storing module 227 to store data to a storage system (e.g., database 116 of system 100). System 200 receives data from one or more data sources and stores the data to the storage system based at least in part on a predefined data protocol. The predefined data protocol may facilitate delineation of one or more partitions of low-level data objects associated with a particular high-level data object. For example, the predefined data protocol defines (or allow an administrator associated with the data store to define) one or more dimensions of data objects (e.g., a high-level data object) along which the data objects may be partitioned. Data storing module 227 can store, manage, or have access to, the metadata that associates one or more low-level data objects to a high-level data object, and the metadata may include information pertaining to (e.g., a definition of) one or more dimensions of the high-level data object along which the high-level data object is partitioned. As an example, data storing module 227 stores (e.g., in metadata for high-level data objects) a mapping of partitions of low-level data objects to corresponding high-level data objects. As an example, with respect to tables, the predefined data protocol can define a particular structure of the table that comprises information indicative of how files are mapped (e.g., how low-level data object(s) are mapped to the high-level data object). Accordingly, in response to a query being run with respect to data comprised in the table, the system knows how the table is formatted and can efficiently determine the applicable low-level data objects responsive to the query. According to various embodiments, the predefined data protocol supports an open data format.

In some embodiments, in connection with storing a high-level data object, data storing module 227 segments the high-level data object based on the predefined data protocol, and stores the segments (e.g., low-level data objects, partitions, etc.) to the storage system.

In some embodiments, system 200 comprises access request module 229. System 200 uses access request module 229 to receive and process data access requests received by system 200. For example, in response to communication module 225 receiving a data access request from a data requesting service (e.g., a data recipient), the data access request is provided to access request module 229. In response to receiving the data access request, access request module 229 determines a high-level data object for which access is being requested, and/or information identifying the data requesting service. For example, the data access request includes an identifier (e.g., an ID, a name, a label, etc.) associated with the high-level data object, and access request module 229 obtains the identifier from the data access request. As another example, the data access request includes (or points to) a credential associated with the data recipient, and access request module 229 obtains the credential.

In some embodiments, system 200 comprises permissions module 231. System 200 uses permissions module 231 to determine whether a data requesting service (e.g., a data recipient) associated with a received data access request has permission to access the high-level data object corresponding to the data access request. For example, permissions module 231 uses a credential obtained from the data access request to determine access permissions with respect to the credential or the high-level data object. In some embodiments, system 200 stores a mapping of credentials to access permissions, and permissions module 231 uses the credential to query the mapping in connection with determining whether the associated data requesting service has requisite permissions to access the high-level data object.

In some embodiments, system 200 comprises low-level data object determination module 233. System 200 uses low-level data object determination module 233 to determine one or more low-level data objects associated with a particular high-level data object, such as a high-level data object corresponding to a data access request. In some embodiments, low-level data object determination module 233 determines the one or more low-level data objects associated with a particular high-level data object based at least in part on metadata stored in association with the high-level data object. For example, low-level data object determination module 233 queries the metadata (e.g., using an identifier for the high-level data object—for example, a table name) to determine the one or more low-level data objects mapped to (e.g., file(s) associated with) the high-level data object. In some embodiments, the file(s) associated with the high-level object are stored in one or more storage systems (e.g., one, two, three, etc.) each with their own distinct credentials and/or encryptions—for example, a first set of files has a first credential and/or first set of cryptographic keys on a first storage system and a second set of files has a second credential and/or second set of cryptographic keys on a second storage system.

According to various embodiments, system 200 implements (e.g., in connection with storing a high-level data object) a predefined data protocol according to which the metadata is stored with respect to high-level data objects stored at the storage system, and the metadata comprises information indicative of one or more pre-determined partitions of the high-level data object, one or more dimensions of the high-level data object along which the high-level data object is partitioned (or to be partitioned), and/or a manner by which access to low-level data objects associated with the high-level data object is to be provided. In various embodiments, the metadata stores the appropriate mapping for high-level to low-level objects with appropriate storage system identifiers, storage system credentials, user permissions, sets of cryptographic keys, storage system file names and/or locations, and any other appropriate information.

In response to determining the one or more low-level data objects associated with a high-level data object subject to a data access request, system 200 uses permissions module 231 to determine whether the data requesting service (e.g., the data recipient) has permission to access the one or more low-level data objects associated with the high-level data object. For example, permissions module 231 determines whether the data requesting service has permission to access any of the one or more low-level data objects and/or determines which of the one or more low-level data objects the data requesting service has permission to access. Permissions module 231 can use the metadata associate with the high-level data object and/or the one or more low-level data object and/or a security policy in connection with determining whether the data requesting service has permission to access the one or more low-level data objects.

The access permissions can be defined in a security policy (e.g., a security policy that is configurable by an administrator of the system, etc.). System 200 can store metadata indicating requisite access permissions to corresponding low-level data objects. System 200 can use the metadata indicating the requisite access permissions to corresponding low-level data objects to determine whether a user or system (e.g., a data requesting service) associated with a data access request has appropriate permissions to access a particular low-level data object. System 200 can use the metadata indicating the requisite access permissions to corresponding low-level data objects to determine one or more low-level objects, if any, to which a user or system (e.g., a data requesting service) associated with a data access request has appropriate permissions to access (e.g., in connection with a request to access the high-level data object to which the low-level data object(s) is mapped).

In some embodiments, system 200 comprises sharing module 235. System 200 uses sharing module 235 to configure data shares and/or data recipients, such as in response to a configuration request received from an administrator. Sharing module 235 creates data shares for data (e.g., subsets of data) stored in a storage system. For example, sharing module 235 can set (e.g., select) one or more high-level data objects to be shared (e.g., with data recipients). Sharing module 235 sets (e.g., defines) one or more data recipients to be provided access to a corresponding data share. For example, sharing module 235 registers a data recipient with respect to the data share (e.g., stores in a mapping of data shares to access permissions an identifier or credential associated with a data recipient to be provided access to such data share). Sharing module 235 can register the data recipient in response to a request from an administrator of the data stored in the storage system. In connection with registration of the data recipient, sharing module 235 obtains a credential to be provided to the data recipient for use in connection with processing data access requests (e.g., a credential for data requesting services to include in the data access requests). In some embodiments, sharing module 235 generates metadata for sharing data in one or more cloud-based storage systems.

In some embodiments, system 200 comprises URL generation module 237. System 200 uses URL generation module 237 to obtain a URL for the one or more low-level data objects to which a data requesting service is to be provided access (e.g., the one or more low-data objects that are associated with a high-level data object subject to a data access request, and that the data requesting service has requisite permission to access).

According to various embodiments, the URL is determined based at least in part on the metadata that associates one or more low-level data objects (e.g., partitions) with a high-level data object. For example, the URL is determined (e.g., by URL generation module 237) based at least in part on a mapping of low-level data objects to the high-level data object(s) responsive to the data access request. In some embodiments, obtaining the URL comprises generating the URL via which a data requesting service can access the set of data. As an example, the URL corresponds to a location of a partition of a high-level on a storage system (e.g., a cloud storage system such as a third-party storage system, etc.) that is responsive to the data access request and to which the data requesting service has permission to access. In some embodiments, the URL expires after a predefined period of time (e.g., an amount of time after generation of the URL, or after sending the URL to the data requesting service or other system associated with the corresponding data access request. The predefined period of time may be set based on administrator configurations or a security policy for the system. Examples of a predefined period of time include 30 minutes, 1 hour, 2 hours, 3 hours, 1 day, etc.

In some embodiments, the URL is configured based on a predefined data protocol according to which data is stored on the storage system. For example, the URL is configured to point to a selected partition of a high-level data object to which access is to be provided in response to the data access request. In some embodiments, the URL is generated based at least in part on a credential to access the data at the storage system. For example, the URL comprises a credential and/or cryptographic key for accessing the data at the storage system.

According to various embodiments, a URL is generated based on a determination to provide access to a first subset of files and to withhold access to a second subset of files. In some embodiments, the URL includes a cryptographic key or a reference to a cryptographic key such as a location at which the cryptographic key can be accessed. The cryptographic key can be used to provide access to a first subset of files and to withhold access to a second subset of files. For example, the cryptographic key can correspond to a credential to decrypt a set of low-level data objects such as files, or information corresponding to a subset of a table (e.g., a particular set of row(s), a particular set of column(s), a portion of one or more rows or one or more columns, etc.). For example, the system uses an encryption of a partition of low-level data object(s) corresponding to a high-level data object to enforce access rights or to implement the delineation among partitions for the high-level data object. For example, a first file or a first row of a table can be encrypted using a first cryptographic key, and a second file or second row of the table can be encrypted using a second cryptographic key that is different from the first cryptographic key. In response to receiving a data access request and a determination that access to the first file/row is to be provided and that access to the second file/row is to be restricted, the URL is configured to comprise (or reference/point to) the first cryptographic key (e.g., and to exclude the second cryptographic key).

In some embodiments, system 200 comprises user interface module 239. System 200 uses user interface module 239 to provide a user interface to a user (e.g., via a client system, etc.) via which the user configures/defines data shares, data recipients to be provided access to such data shares, access permissions with respect to the data recipients and/or high-level data objects or low-level data objects, etc.

According to various embodiments, storage 215 comprises one or more of filesystem data 260, data share data 265, and/or metadata 270. Storage 215 comprises a shared storage (e.g., a network storage system) and/or database data, and/or user activity data.

In some embodiments, filesystem data 260 comprises a database such as one or more datasets (e.g., one or more datasets for one or more features, models, schemas, tables, etc.).

In some embodiments, data share data 265 comprises information pertaining to data shares. For example, data share data 265 comprises an indication of data shares for which access is to be provided to a data recipient (e.g., a registered data recipient) and/or comprises configuration settings for data shares. As an example, data share data 265 stores an index of data shares for data stored in a storage system and information pertaining to one or more high-level data objects logically comprised in the data share (e.g., an identifier of a high-level data object), etc. In some embodiments, data share data 264 comprises an index of data recipients, such as a mapping of data shares to permitted data recipients, etc.

In some embodiments, metadata 270 comprises information pertaining to high-level data objects stored in the storage system, such as data stored in accordance with the predefined data protocol. Metadata 270 comprises information indicating the mapping/relationship of a particular low-level data object to the high-level data object. In some embodiments, metadata 270 includes information indicative of one or more pre-determined partitions of the high-level data object, one or more dimensions of the high-level data object along which the high-level data object is partitioned (or to be partitioned), or a manner by which access is to be provided to low-level data objects associated with the high-level data object.

According to various embodiments, memory 220 comprises executing application data 275. Executing application data 275 comprises data obtained or used in connection with executing an application such as an application executing in connection with providing the access to data shares (e.g., low-level data objects corresponding to high-level data objects subject to a data access request), an application that enforces security of data in the storage system, an application that monitors data and operations of the data sharing or accessing of data shares, an application that executes code being developed in a workspace, etc. In some embodiments, executing application data 275 comprises data pertaining to URLs generated by system 200 in connection with providing access in response to data access requests, or information pertaining to received data access requests such as an indication of high-level data objects associated with the data access request, an indication of associated low-level data objects, information pertaining to access permissions for the data requesting service associated with a data access request, etc. In various embodiments, the application comprises one or more applications that perform one or more of receiving and/or executing a query or command, generating a report and/or configure information that is responsive to an executed query or command, and/or to providing to a user information that is responsive to a query or command. Other applications comprise any other appropriate applications (e.g., an index maintenance application, a communications application, a chat application, a web browser application, a document preparation application, a report preparation application, a user interface application, a data analysis application, an anomaly detection application, a user authentication application, a security policy enforcement application, a code analysis application, a code development application, etc.).

Figure 3:
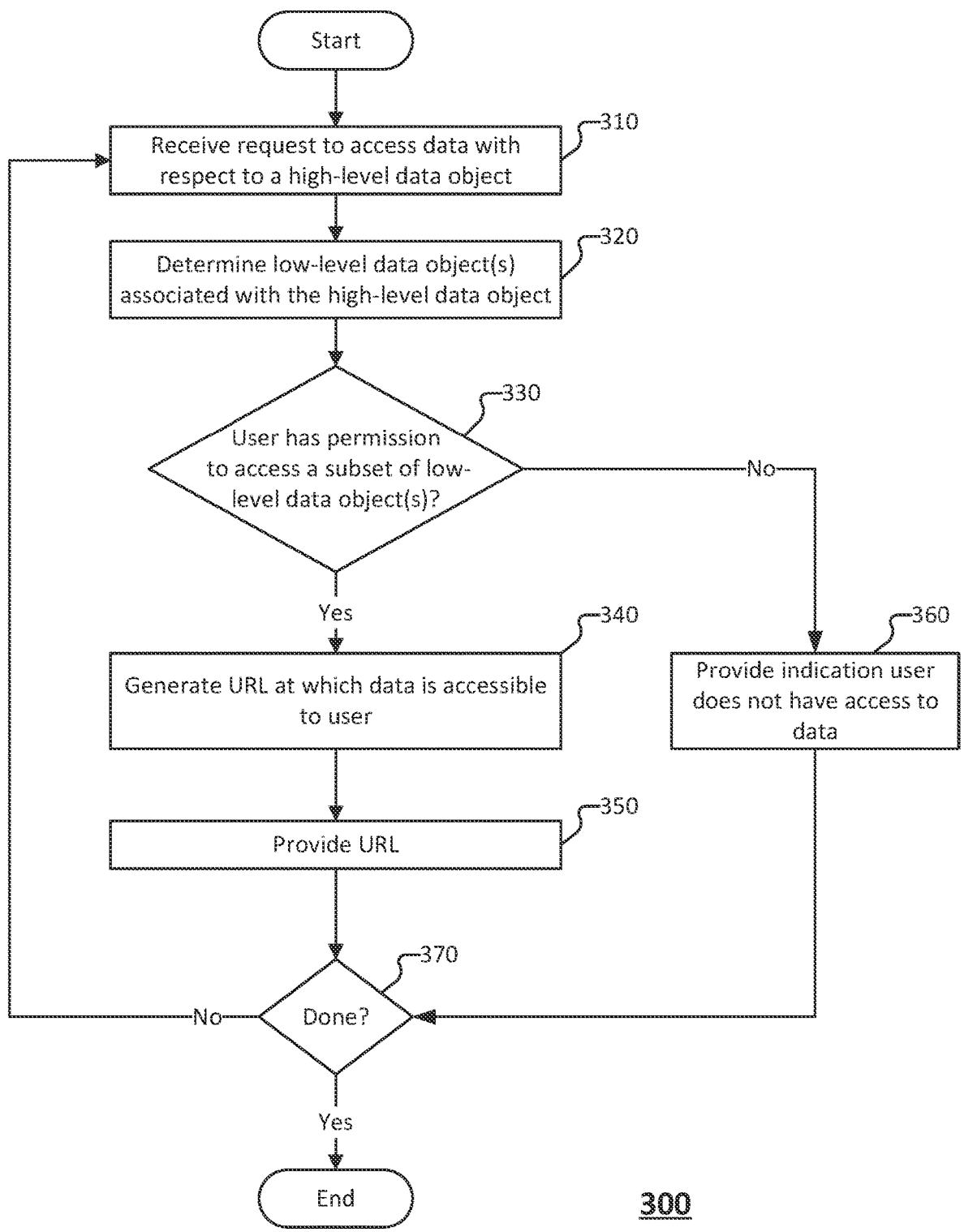
FIG. 3 is a flow diagram of a method for sharing data according to various embodiments of the present application.

FIG. 3 is a flow diagram of a method for sharing data according to various embodiments of the present application. In some embodiments, at least part of process 300 is implemented by system 100 of FIG. 1 or system 200 of FIG. 2.

At 310, a request to access data with respect to a high-level data object is received. In some embodiments, the system receives the request to access data (e.g., a data access request) from a data recipient. For example, a data sharing service is implemented by one or more servers, and the data sharing service receives the request to access the data with respect to the high-level data object from a data requesting service, which can be implemented on a client system or a server such as a third-party service. In some embodiments, the data requesting service communicates the request to access data via a connector or other module running on the data requesting service, such as an API that is configured based at least in part on a predefined data protocol according to which the data sharing service stores data.

At 320, low-level data object(s) associated with the high-level data object is determined. In response to receiving the request to access data with respect to a high-level data object, the system determines a set of one or more low-level data objects associated with the high-level data object. As an example, a low-level data object can correspond to a partition of the high-level data object. In some embodiments, determining the low-level data object(s) associated with the high-level data objects comprises determining the various partitions of the high-level data object.

According to various embodiments, the system determines the low-level data object(s) associated with the high-level data object based at least in part on metadata that is stored in accordance with a predefined data protocol contemporaneous with storing of the high-level data object. In some embodiments, the metadata associates one or more low-level data objects to a high-level data object. In some embodiments, the metadata includes information pertaining to (e.g., a definition of) one or more dimensions of the high-level data object along which the high-level data object is partitioned. As an example, the metadata stores a mapping of partitions of low-level data objects to corresponding high-level data objects.

The system determines an identifier associated with the high-level data object associated with the access request, and the system uses the identifier of the high-level data object in connection with querying/performing a lookup with respect to metadata associated with the high-level data object to determine one or more low-level data objects associated with the high-level data object (e.g., low-level data objects mapped to the high-level data object).

At 330, a determination is made as to whether a user has permission at least a subset of low-level data objects. In some embodiments, the system determines whether the user associated with the access request (or data requesting service from which the request to access the data is received) has requisite permissions to access at least a subset of low-level data objects. For example, the system determines which low-level data objects (if any) that the user has permission to access from among the low-level data object(s) associated with the high-level data object.

The system determines whether the user (or data requesting service) has permission to access at least the subset of low-level data objects based at least in part on access permissions mapped to the subset of low-level data object (s). The mapping of low-level data objects (or types/classes of low-level data objects) to access permissions can be stored in the metadata, or in a security policy, etc.

In some embodiments, the system determines whether the user (or data requesting service) has permission to access the low-level data object based at least in part on an identifier or credential associated with the user. For example, the system determines the user identifier or credential based at least in part on the access request. The access request can comprise a credential or identifier, such as a credential/identifier that is registered by the system (e.g., the data sharing service) associated with a particular data share.

In response to a determination that the user has permission with respect to at least the subset of low-level data objects, process 300 proceeds to 340 at which a URL at which data is accessible to the user (e.g., data requestor) is generated.

At 350, the URL is provided. The system obtains the URL in response to determining that the user has permission to access the subsets of low-level data objects.

In some embodiments, the system provides to the user (e.g., the data recipient) access to the one or more low-level data objects via one or more URLs corresponding to a location at which the one or more low-level data objects can be obtained (e.g., a location on a cloud storage system from which the low-level data object can be accessed). As an example, the system obtains (e.g., generates) the URL(s) based at least in part on the metadata for the high-level data object subject to (e.g., identified by) a data access request. For example, the URL(s) is/are determined based at least in part on a mapping of low-level data objects to the high-level data object(s) responsive to the data access request. As another example, the URL(s) is/are determined based at least in part on (i) a mapping of low-level data objects to the high-level data object(s) responsive to the data access request, and (ii) a set of low-level data objects for which the user has permission to access.

In some embodiments, the obtaining the URL comprises generating the URL via which a data recipient can access the set of data. As an example, the URL corresponds to a location of a partition(s) of a high-level on a storage system (e.g., a cloud storage system such as a third-party storage system, etc.) that is responsive to the access request and to which the user has permission to access. The URL can be configured based on a location of the corresponding low-level data object(s), a credential for accessing the low-level data objects (e.g., that are stored on a storage system such as a cloud storage system), and a location of the low-level data objects. In some embodiments, the URL expires after a predefined period of time (e.g., an amount of time after generation of the URL, or after sending the URL to the data requesting service or other system associated with the corresponding data access request. For example, the system configures the URL with an expiration time corresponding to a predefined period of time after which the URL expires (and is no longer usable to access the corresponding low-level data object(s)). As another example, the URL comprises a timestamp from the time at which the URL is generated, and the cloud storage system implements a predefined period of time after which the corresponding URL is deemed expired. For example, the cloud storage system can use a time at which the URL is accessed by the data recipient, the timestamp associated with the URL generation, and the predefined period of time after which the URL is deemed expired in connection with determining whether the URL is expired or active. The predefined period of time may be set based on administrator configurations or a security policy for the system. Examples of a predefined period of time include 30 minutes, 1 hour, 2 hours, 3 hours, 1 day, etc.

In some embodiments, the URL is configured based on a predefined data protocol according to which data stored on the storage system is stored. For example, the URL is configured to point to a selected partition of a high-level data object(s) to which access is to be provided in response to the data access request. In some embodiments, the URL is generated based at least in part on a credential to access the data at the storage system. For example, the URL comprises a credential for accessing the data at the storage system. As another example, the URL is signed with a credential for accessing the data at the storage system.

According to various embodiments, the URLs are used to enforce access permissions with respect to the high-level data object on a partition-by-partition basis. For example, sets of low-level data objects respectively corresponding to partitions of the high-level data object can be stored at different locations on the storage system, and the URL(s) is configured based on a location to the one or more sets of low-level data objects to which access is to be provided (e.g., in response to the data access request). For one or more sets of low-level data objects for which access is to be restricted (e.g., not provided in response to the data access request), the URL is configured to exclude locations of such set(s) of low-level data objects. As another example, the URL is configured based on one or more cryptographic keys (e.g., a cryptographic key that is comprised in a pair comprising a cryptographic key that was used to encrypt certain data). For example, the system configures the URL to include (or reference) one or more cryptographic keys for one or more sets of low-level data objects for which access is to be provided to the data recipient. If the system determines that the data recipient does not have permission to access a particular set of low-level data object(s), the system configures the URL to exclude cryptographic keys for such particular set of low-level data object(s). Because the URL is configured to exclude cryptographic keys for low-level data objects to which the data recipient does not have permission to access, the data recipient will not be able to consume (e.g., decrypt and read) the corresponding low-level data objects.

The data recipient (e.g., the user associated with the access request) uses the URL to retrieve the data (e.g., the at least the subset of the high-level object for which the data recipient is permitted to access). In some embodiments, the data recipient is able to retrieve the data responsive to the access request without providing another credential to the cloud storage system on which the data is stored. For example, the URL is signed with a credential that provides the cloud storage system an indication that access to the corresponding data is permitted.

Conversely, in response to a determination that the user does not have permission with respect to at least the subset of low-level data objects, process 300 proceeds to 360 at which an indication that the user does not have access to the data is provided to the user (e.g., data requestor).

At 370, a determination is made as to whether process 300 is complete. In some embodiments, process 300 is determined to be complete in response to a determination that no further data is to be shared, no further requests to access data are to be processed, no further access requests are obtained or otherwise to be processed, the processing of data sharing is paused or stopped, a user has exited the system, an administrator indicates that process 300 is to be paused or stopped, etc. In response to a determination that process 300 is complete, process 300 ends. In response to a determination that process 300 is not complete, process 300 returns to 310.

Figure 4:
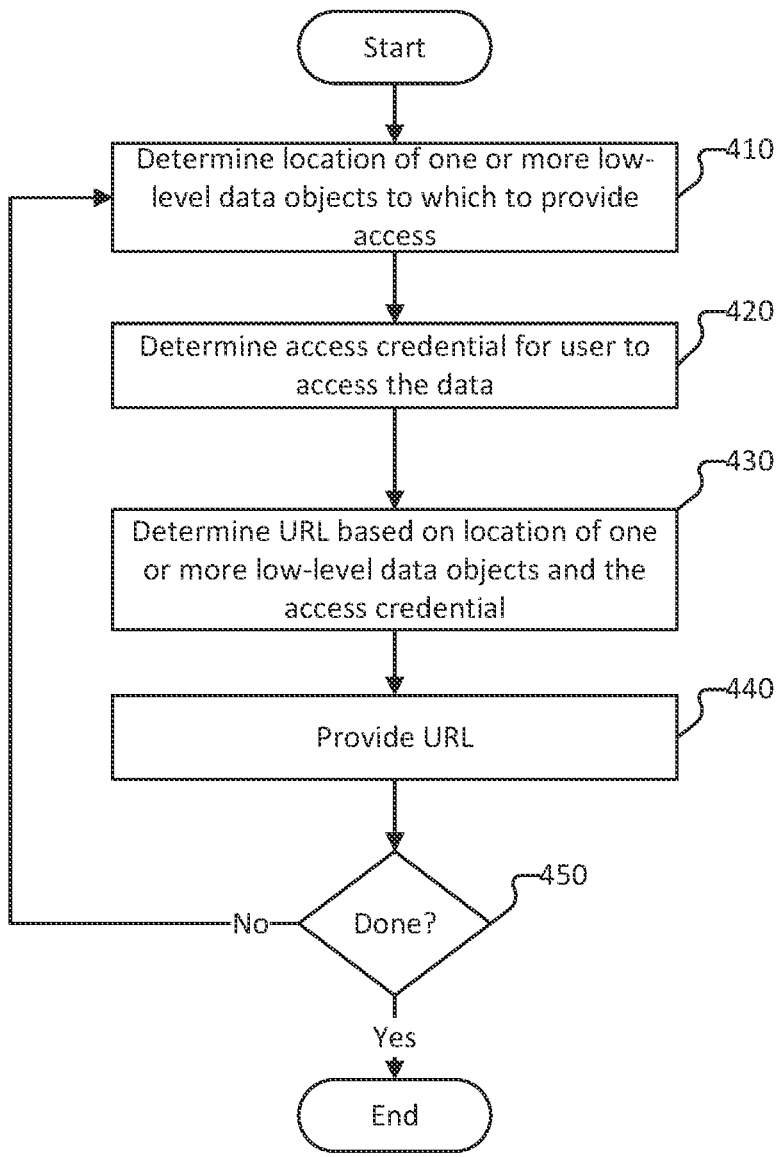
FIG. 4 is a flow diagram of a method for sharing data according to various embodiments of the present application.

FIG. 4 is a flow diagram of a method for sharing data according to various embodiments of the present application. In some embodiments, at least part of process 400 is implemented by system 100 of FIG. 1 or system 200 of FIG. 2. In some embodiments, process 400 is implemented in connection with 340 of process 300 of FIG. 3.

At 410, a location of one or more low-level data objects to which access is to be provided is determined. In some embodiments, the system determines the location of the one or more low-level data objects based at least in part on (i) the predefined data protocol according to which the corresponding high-level data object is stored and/or (ii) the metadata that associates low-level data objects to high-level data objects.

At 420, an access credential for the user to access the data is determined. For example, the system determines an access credential with which to sign a URL to permit access to the low-level data objects for the data requestor.

At 430, a URL is determined based at least in part on a location of one or more low-level data objects and the access credential. For example, the system generates a URL that is directed to the location of the one or more low-level data objects and that is signed with the access credential that is used by the storage system (e.g., a third-party cloud storage system) to determine that the data requestor is permitted to access the low-level data objects corresponding to the URL.

At 440, the URL is provided. For example, the URL can be provided to a process that invoked process 400, or to the data requestor, etc.

At 450, a determination is made as to whether process 400 is complete. In some embodiments, process 300 is determined to be complete in response to a determination that no further data is to be shared, no further requests to access data are to be processed, no further access requests are obtained or otherwise to be processed, the processing of data sharing is paused or stopped, a user has exited the system, an administrator indicates that process 400 is to be paused or stopped, etc. In response to a determination that process 400 is complete, process 400 ends. In response to a determination that process 400 is not complete, process 400 returns to 410.

Figure 5:
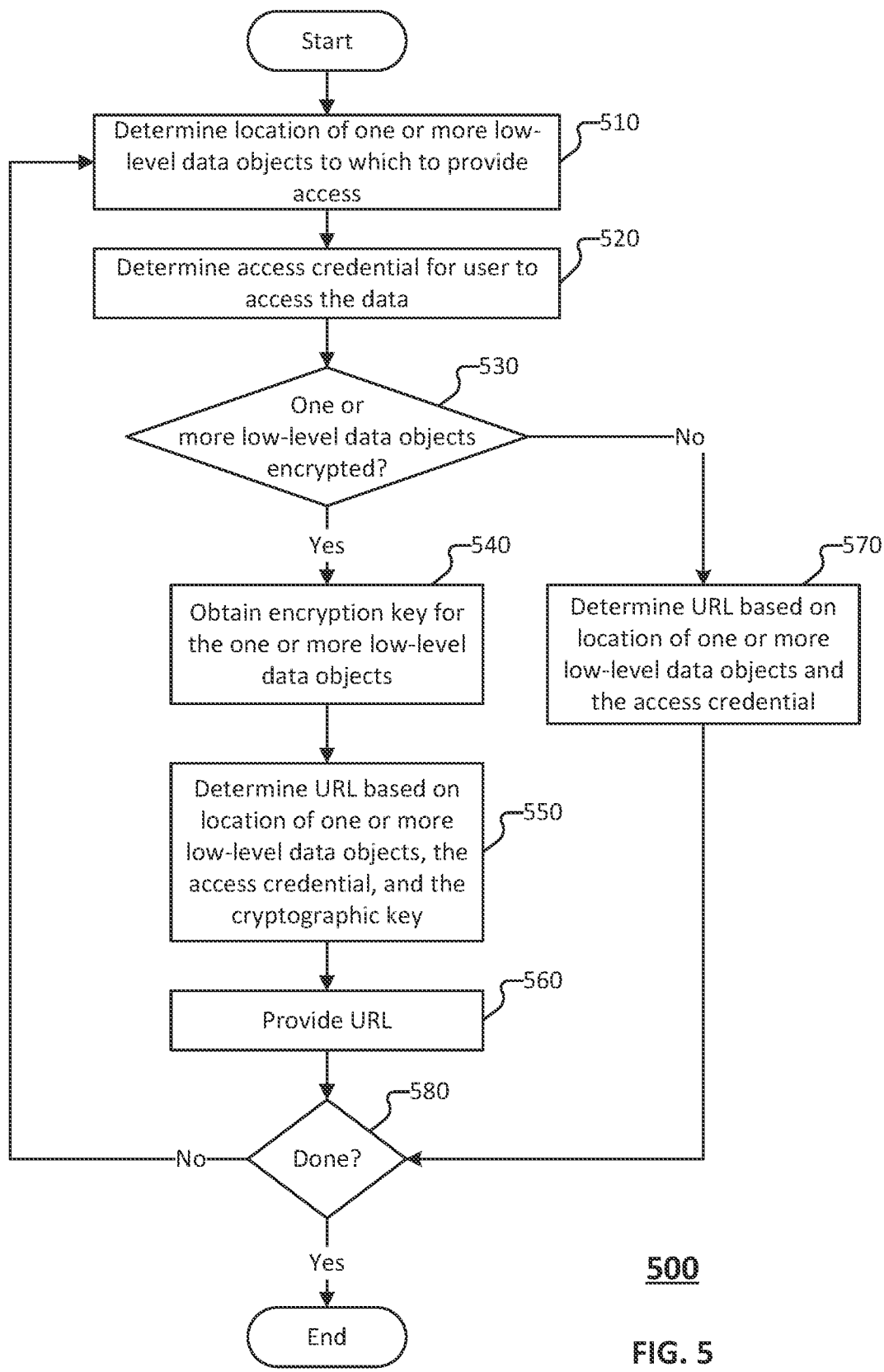
FIG. 5 is a flow diagram of a method for sharing data according to various embodiments of the present application.

FIG. 5 is a flow diagram of a method for sharing data according to various embodiments of the present application. In some embodiments, at least part of process 500 is implemented by system 100 of FIG. 1 or system 200 of FIG. 2. In some embodiments, process 500 is implemented in connection with 340 of process 300 of FIG. 3.

At 510, a location of one or more low-level data objects to which access is to be provided is determined. In some embodiments, the system determines the location of the one or more low-level data objects based at least in part on (i) the predefined data protocol according to which the corresponding high-level data object is stored and/or (ii) the metadata that associates low-level data objects to high-level data objects.

At 520, an access credential for the user to access the data is determined. For example, the access credential is determined for a user (e.g., a data requestor) to access the one or more low-level data objects to which the user is to be provided access. The system determines an access credential with which to provide in connection with the URL to permit access to the low-level data objects stored on a third-party storage system (e.g., an access credential with which to sign a URL to permit access to the low-level data objects).

At 530, a determination is made as to whether at least one of the one or more low-level data objects is encrypted. The system determines whether the at least one of the one or more low-level data objects is encrypted based on the predefined data protocol according to which a high-level data object is stored and/or metadata associated with the high-level data object or corresponding low-level data objects. Different subsets of low-level data objects associated with a high-level data object may be encrypted using different cryptographic keys or encryption methods to enforce access restriction on a partition-by-partition basis (e.g., a low-level data object by low-level data object basis, or a subset of low-level data objects by subset of low-level data object basis).

In response to determining that at least one of the one or more low-level data objects is encrypted at 530, process 500 proceeds to 540 at which a cryptographic key(s) for the one or more low-level data objects is obtained.

At 550, a URL is determined based at least in part on a location of one or more low-level data objects, the access credential, and the cryptographic key. The system generates a URL that is (i) directed to the location of the one or more low-level data objects, (ii) signed with the access credential that is used by the storage system (e.g., a third-party cloud storage system) to determine that the data recipient is permitted to access the low-level data objects corresponding to the URL, and (iii) comprises (or points to) one or more cryptographic keys to use to decrypt the one or more low-level data objects for which the URL is used to access.

At 560, the URL is provided. The URL can be provided to a process that invoked process 400, or to the data recipient, etc.

In response to determining that at least one of the one or more low-level data objects is not encrypted at 530, process 500 proceeds to 560 at which URL is determined based at least in part on a location of one or more low-level data objects and the access credential.

At 580, a determination is made as to whether process 500 is complete. In some embodiments, process 300 is determined to be complete in response to a determination that no further data is to be shared, no further requests to access data are to be processed, no further access requests are obtained or otherwise to be processed, the processing of data sharing is paused or stopped, a user has exited the system, an administrator indicates that process 500 is to be paused or stopped, etc. In response to a determination that process 500 is complete, process 500 ends. In response to a determination that process 500 is not complete, process 500 returns to 510.

Figure 6:
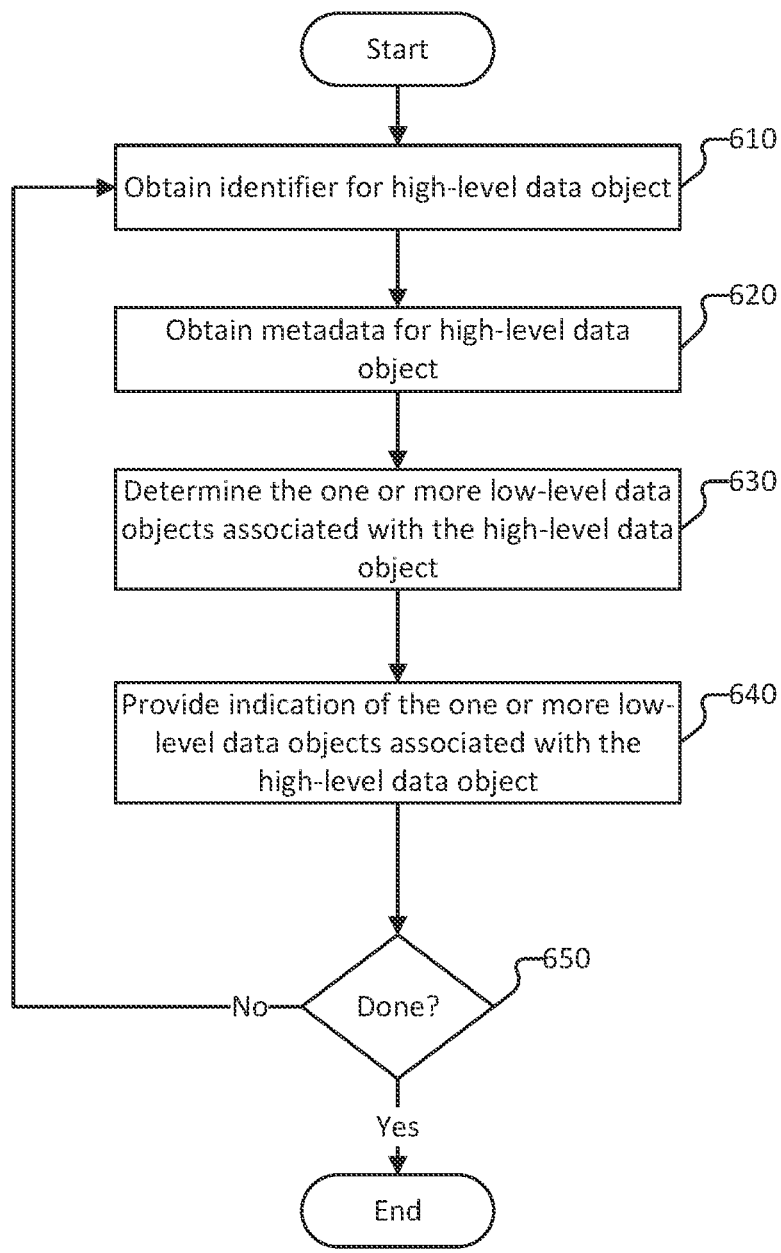
FIG. 6 is a flow diagram of a method for sharing data according to various embodiments of the present application.

FIG. 6 is a flow diagram of a method for sharing data according to various embodiments of the present application. In some embodiments, at least part of process 600 is implemented by system 100 of FIG. 1 or system 200 of FIG. 2. In some embodiments, process 600 is invoked in connection with 320 of process 300 of FIG. 3.

At 610, an identifier for high-level data object is obtained. In some embodiments, the identifier for high-level data is determined based at least in part on a request to access data. For example, in response to receiving the request to access particular data, the system determines the identifier for high-level data corresponding to the data for which access is being requested. In some embodiments, the identifier for the high-level data is comprised in the request to access data (e.g., that the system receives from the user such as via a data requesting service).

At 620, metadata for the high-level data object is obtained. In some embodiments, the metadata associates one or more low-level data objects to a high-level data object. In some embodiments, the metadata includes information pertaining to (e.g., a definition of) one or more dimensions of the high-level data object along which the high-level data object is partitioned. As an example, the metadata stores a mapping of partitions of low-level data objects to corresponding high-level data objects.

According to various embodiments, the metadata is stored contemporaneous with the storing of the high-level data object.

At 630, one or more low-level data objects associated with the high-level data object are determined. In some embodiments, the system determines the one or more low-level data objects associated with the high-level data object based at least in part on the metadata.

The system determines an identifier associated with the high-level data object associated with the access request, and the system uses the identifier of the high-level data object in connection with querying/performing a lookup with respect to metadata associated with the high-level data object to determine one or more low-level data objects associated with the high-level data object (e.g., low-level data objects mapped to the high-level data object).

At 640, an indication of the one or more low-level data objects is provided. The URL can be provided to a process that invoked process 400, or to the data recipient, etc.

At 650, a determination is made as to whether process 600 is complete. In some embodiments, process 600 is determined to be complete in response to a determination that no further data is to be shared, no further requests to access data are to be processed, no further access requests are obtained or otherwise to be processed, the processing of data sharing is paused or stopped, a user has exited the system, an administrator indicates that process 600 is to be paused or stopped, etc. In response to a determination that process 600 is complete, process 600 ends. In response to a determination that process 600 is not complete, process 600 returns to 610.

Figure 7:
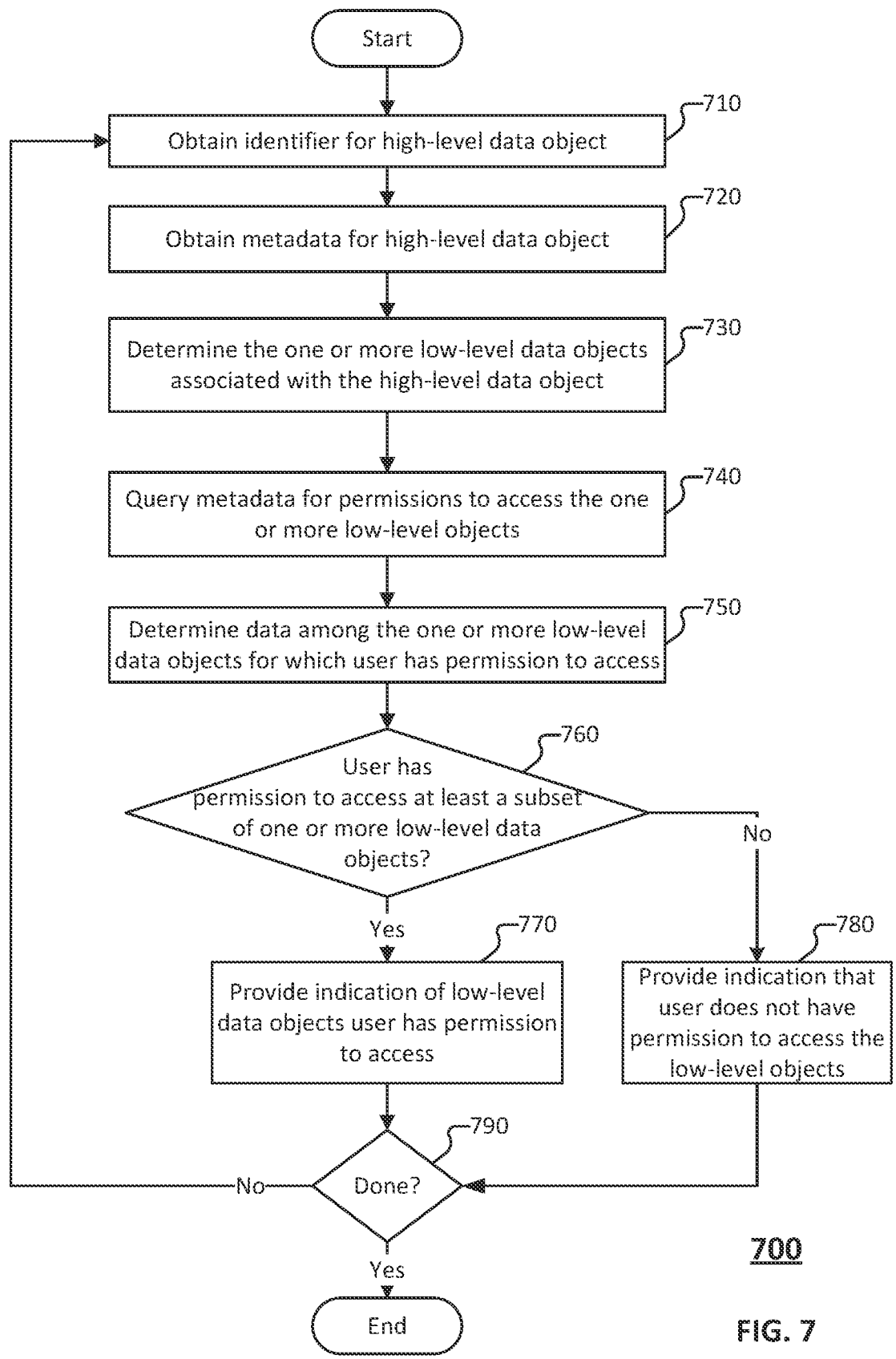
FIG. 7 is a flow diagram of a method for sharing data according to various embodiments of the present application.

FIG. 7 is a flow diagram of a method for sharing data according to various embodiments of the present application. In some embodiments, at least part of process 700 is implemented by system 100 of FIG. 1 or system 200 of FIG. 2. In some embodiments, process 400 is implemented in connection with 330 of process 300 of FIG. 7.

At 710, an identifier for high-level data object is obtained. In some embodiments, the identifier for high-level data is determined based at least in part on a request to access data. For example, in response to receiving the request to access particular data, the system determines the identifier for high-level data corresponding to the data for which access is being requested. In some embodiments, the identifier for the high-level data is comprised in the request to access data (e.g., that the system receives from the user such as via a data requesting service).

At 720, metadata for the high-level data object is obtained. In some embodiments, the metadata associates one or more low-level data objects to a high-level data object. In some embodiments, the metadata includes information pertaining to (e.g., a definition of) one or more dimensions of the high-level data object along which the high-level data object is partitioned. As an example, the metadata stores a mapping of partitions of low-level data objects to corresponding high-level data objects.

According to various embodiments, the metadata is stored contemporaneous with the storing of the high-level data object.

At 730, one or more low-level data objects associated with the high-level data object are determined. In some embodiments, the system determines the one or more low-level data objects associated with the high-level data object based at least in part on the metadata. In some embodiments, the system determines the one or more low-level data objects based on a request that invokes process 700 (e.g., if 330 of process 300 invokes process 700, the process 300 provides the low-level data object(s) determined at 320 of process 300).

The system determines an identifier associated with the high-level data object associated with the access request, and the system uses the identifier of the high-level data object in connection with querying/performing a lookup with respect to metadata associated with the high-level data object to determine one or more low-level data objects associated with the high-level data object (e.g., low-level data objects mapped to the high-level data object).

At 740, the metadata is queried for permissions to access the one or more low-level data objects. In some embodiments, the metadata stored in connection with the one or more low-level data objects or high-level data object comprises an indication of access permissions for the low-level data objects. The system obtains a mapping of access permissions to a corresponding low-level data object.

At 750, data among the one or more low-level data objects for which the user has permission to access is determined. In response to obtaining the access permissions with respect to the corresponding low-level data object(s), the system determines whether the user has permission to access the low-level data object(s). For example, the system determines whether an identifier or credential associated with the user is comprised in a set of data recipients for which access to the corresponding low-level data object is permitted. In some embodiments, the determining the data among the one or more low-level data objects comprises determining which, if any, low-level data objects the user has permission to access.

In some embodiments, the system determines whether a registration of a data recipient with respect to a data share comprises access to the one or more low-level data objects.

At 760, a determination is made as to whether a user has permission at least a subset of low-level data object(s).

In response to a determination that the user has access permission with respect to at least the subset of low-level data objects at 760, process 700 proceeds to 770 at which an indication of the low-level data objects to which the user has permission to access is provided.

Conversely, in response to a determination, that the user does not have access permission with respect to at least the subset of low-level data objects at 760, process 700 proceeds to 780 at which an indication that the user does not have permission to access the low-level objects is provided.

At 790, a determination is made as to whether process 700 is complete. In some embodiments, process 300 is determined to be complete in response to a determination that no further data is to be shared, no further requests to access data are to be processed, no further access requests are obtained or otherwise to be processed, the processing of data sharing is paused or stopped, a user has exited the system, an administrator indicates that process 700 is to be paused or stopped, etc. In response to a determination that process 700 is complete, process 700 ends. In response to a determination that process 700 is not complete, process 700 returns to 710.

Various examples of embodiments described herein are described in connection with flow diagrams. Although the examples may include certain steps performed in a particular order, according to various embodiments, various steps may be performed in various orders and/or various steps may be combined into a single step or in parallel.

Although the foregoing embodiments have been described in some detail for purposes of clarity of understanding, the invention is not limited to the details provided. There are many alternative ways of implementing the invention. The disclosed embodiments are illustrative and not restrictive.

The invention claimed is:

1. A method comprising:
   receiving a request to access a set of data associated with a high-level data object, wherein the high-level data object comprises one of a data table, a view, a database, or a model;
   determining, using an identifier for the high-level data object, one or more low-level data objects corresponding to the high-level data object, wherein the one or more low-level data objects comprises one or more data files;
   determining that a user associated with the request has permission to access a first subset of the low-level data objects that are a first subset of data files but does not have permission to access a second subset of the low-level data objects that are a second subset of data files; and
   generating a uniform resource locator (URL) that provides access to the first subset of the low-level data objects is accessible by the user, but does not provide access to the second subset of the low-level data objects; and
   returning the URL in response to the request.

2. The method of claim 1, further comprising:
   determining locations of the first subset of the low-level data objects and the second subset of the low-level data objects based on metadata associated with the high-level data object, the metadata indicating a mapping of the high-level data object to the one or more low-level data objects,
   wherein the generated URL is directed to at least the determined locations of the first subset of the low-level data objects.

3. The method of claim 1, wherein the URL includes an access key to access the first subset of low-level data objects but does not include an access key to access the second subset of low-level data objects.

4. The method of claim 3, wherein the first subset of low-level data objects is encrypted using a first cryptographic key and the second subset of low-level data objects is encrypted using a second cryptographic key.

5. The method of claim 1, wherein the URL is configured to expire after a predetermined amount of time.

6. The method of claim 1, further comprising:
   receiving a second request to access the set of data associated with the high-level data object;
   determining that a user associated with the second request has permission to access the first subset of the low-level data objects and the second subset of the low-level data objects; and
   generating a second URL that provides access to the first subset of the low-level data objects and the second subset of the low-level data objects; and
   returning the second URL in response to the second request.

7. A system comprising:
   one or more computer processors; and
   one or more computer-readable mediums storing instructions that, when executed by the one or more computer processors, cause the system to perform operations comprising:
      receiving a request to access a set of data associated with a high-level data object, wherein the high-level data object comprises one of a data table, a view, a database, or a model;
      determining, using an identifier for the high-level data object, one or more low-level data objects corresponding to the high-level data object, wherein the one or more low-level data objects comprise one or more data files;
      determining that a user associated with the request has permission to access a first subset of the low-level data objects that are a first subset of data files but does not have permission to access a second subset of the low-level data objects that are a second subset of data files; and
      generating a uniform resource locator (URL) that provides access to the first subset of the low-level data objects is accessible by the user, but does not provide access to the second subset of the low-level data objects; and
      returning the URL in response to the request.

8. The system of claim 7, the operations further comprising:
   determining locations of the first subset of the low-level data objects and the second subset of the low-level data objects based on metadata associated with the high-level data object, the metadata indicating a mapping of the high-level data object to the one or more low-level data objects,
   wherein the generated URL is directed to at least the determined locations of the first subset of the low-level data objects.

9. The system of claim 7, wherein the URL includes an access key to access the first subset of low-level data objects but does not include an access key to access the second subset of low-level data objects.

10. The system of claim 9, wherein the first subset of low-level data objects is encrypted using a first cryptographic key and the second subset of low-level data objects is encrypted using a second cryptographic key.

11. The system of claim 7, wherein the URL is configured to expire after a predetermined amount of time.

12. The system of claim 7, the operations further comprising:
   receiving a second request to access the set of data associated with the high-level data object;
   determining that a user associated with the second request has permission to access the first subset of the low-level data objects and the second subset of the low-level data objects; and
   generating a second URL that provides access to the first subset of the low-level data objects and the second subset of the low-level data objects; and
   returning the second URL in response to the second request.

13. A non-transitory computer-readable medium storing instructions that, when executed by one or more computer processors of one or more computing devices, cause the one or more computing devices to perform operations comprising:
   receiving a request to access a set of data associated with a high-level data object, wherein the high-level data object comprises one of a data table, a view, a database, or a model;
   determining, using an identifier for the high-level data object, one or more low-level data objects corresponding to the high-level data object, wherein the one or more low-level data objects comprises one or more data files;
   determining that a user associated with the request has permission to access a first subset of the low-level data objects that are a first subset of data files but does not have permission to access a second subset of the low-level data objects that are a second subset of data files; and generating a uniform resource locator (URL) that provides access to the first subset of the low-level data objects is accessible by the user, but does not provide access to the second subset of the low-level data objects; and returning the URL in response to the request.

14. The non-transitory computer-readable medium of claim 13, the operations further comprising:

determining locations of the first subset of the low-level data objects and the second subset of the low-level data objects based on metadata associated with the high-level data object, the metadata indicating a mapping of the high-level data object to the one or more low-level data objects, wherein the generated URL is directed to at least the determined locations of the first subset of the low-level data objects.

15. The non-transitory computer-readable medium of claim 13, wherein the URL includes an access key to access the first subset of low-level data objects but does not include an access key to access the second subset of low-level data objects.

16. The non-transitory computer-readable medium of claim 15, wherein the first subset of low-level data objects is encrypted using a first cryptographic key and the second subset of low-level data objects is encrypted using a second cryptographic key.

17. The non-transitory computer-readable medium of claim 13, the operations further comprising:

receiving a second request to access the set of data associated with the high-level data object;

determining that a user associated with the second request has permission to access the first subset of the low-level data objects and the second subset of the low-level data objects; and generating a second URL that provides access to the first subset of the low-level data objects and the second subset of the low-level data objects; and returning the second URL in response to the second request.

* * * * *

UNITED STATES PATENT AND TRADEMARK OFFICE
CERTIFICATE OF CORRECTION

PATENT NO. : 12,182,292 B1  
APPLICATION NO. : 18/162353  
DATED : December 31, 2024  
INVENTOR(S) : Zaharia et al.

Page 1 of 1

It is certified that error appears in the above-identified patent and that said Letters Patent is hereby corrected as shown below:

In the Claims

In Column 29, in Claim 1, Line 17, delete "and".

In Column 29, in Claim 1, Line 20, delete "is accessible by the user" and insert -- that the user has permission to access --, therefor.

In Column 30, in Claim 7, Line 9, delete "and".

In Column 30, in Claim 7, Line 12, delete "is accessible by the user" and insert -- that the user has permission to access --, therefor.

In Column 31, in Claim 13, Line 3, delete "and".

In Column 31, in Claim 13, Line 6, delete "is accessible by the user" and insert -- that the user has permission to access --, therefor.

Signed and Sealed this  
Fourth Day of March, 2025

Coke Morgan Stewart  
*Acting Director of the United States Patent and Trademark Office*